United States Patent
Chakraborty et al.

(10) Patent No.: US 10,755,180 B2
(45) Date of Patent: Aug. 25, 2020

(54) ACCOUNTING FOR LONG-TERM USER INTERACTION WITH AN APPLICATION IN SELECTION OF CONTENT ASSOCIATED WITH THE APPLICATION BY AN ONLINE SYSTEM

(71) Applicant: Facebook, Inc., Menlo Park, CA (US)

(72) Inventors: Tanmoy Chakraborty, San Mateo, CA (US); Lei Wang, Santa Clara, CA (US); Manas Somaiya, Sunnyvale, CA (US); Patrick Edward Bozeman, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 705 days.

(21) Appl. No.: 15/468,874

(22) Filed: Mar. 24, 2017

(65) Prior Publication Data

US 2018/0276544 A1    Sep. 27, 2018

(51) Int. Cl.
*G06N 5/02* (2006.01)
*G06F 16/9535* (2019.01)
*H04L 29/08* (2006.01)
*G06Q 30/02* (2012.01)

(52) U.S. Cl.
CPC ......... *G06N 5/022* (2013.01); *G06F 16/9535* (2019.01); *G06Q 30/0269* (2013.01); *G06Q 30/0277* (2013.01); *H04L 67/22* (2013.01)

(58) Field of Classification Search
CPC .... G06F 16/9535; G06N 20/00; G06N 5/022; G06Q 30/0269; G06Q 30/0277; H04L 67/22
See application file for complete search history.

(56) References Cited

U.S. PATENT DOCUMENTS

| | | | |
|---|---|---|---|
| 2012/0158502 A1* | 6/2012 | Chung et al. | G06Q 30/00 705/14.53 |
| 2013/0159115 A1* | 6/2013 | Adams | G06Q 50/01 705/14.66 |
| 2017/0160881 A1* | 6/2017 | Kanemoto | G06F 3/0482 |
| 2017/0262926 A1* | 9/2017 | High et al. | G06Q 30/0633 |

\* cited by examiner

*Primary Examiner* — Robert A Cassity
*Assistant Examiner* — Brent Johnston Hoover
(74) *Attorney, Agent, or Firm* — Fenwick & West LLP

(57) ABSTRACT

An online system generates one or more models that determine a likelihood of a user interacting with an application over a particular time interval after installing the application. To generate the one or more models, the online system obtains information describing a user's interaction with the application that occurred greater than a threshold time period prior to a time for which user interaction with the application is to be determined. Example user interactions with the application include: usage of the application, numbers of particular interactions with the application, an amount of compensation the application receives from the user, interactions with other users of the application via the application, and any other suitable interactions. Various engagement metrics may be predicted by the one or more models such as an amount of time spent using the application, particular actions taken in the application, and revenue generated by the user in the application.

20 Claims, 3 Drawing Sheets

ACCOUNTING FOR LONG-TERM USER INTERACTION WITH AN APPLICATION IN SELECTION OF CONTENT ASSOCIATED WITH THE APPLICATION BY AN ONLINE SYSTEM

BACKGROUND

This disclosure relates generally to recommending content to online system users, and more specifically to identifying content items or users for presentation to an online system user.

An online system allows its users to connect to and communicate with other online system users. For example, an online system allows a user to maintain content items, such as images or video data, and present the content items to other online system users. An online system user may establish a connection to other users, prompting the online system to present content items received from the other user to the user, encouraging interaction between various users.

However, many conventional online systems merely present a content item received from a user to other users connected to the user. However, merely presenting content received from other users connected to the user may limit the content presented to the user, reducing the user's interaction with content provided by the online system. However, presenting content provided to the online system by users who are not connected to the vowing user may result in a user being presented with content items in which the user has minimal interest. If an online system presents the user with content items in which the user is uninterested, the user may decrease interaction with the online system.

SUMMARY

An online system selects content for presentation to various users based on likelihoods of the user performing various actions with the content or various actions after being presented with the content. For example, the online system maintains one or more models that each predicts a likelihood of the user performing different actions when presented with a content item or within a threshold amount of time after being presented with the content item. However, certain content items provided to the online system are associated with applications and may be presented to incite the user to interact with the application over an extended period of time. For example, a publishing user associated with an application provides the online system with a content item that encourages a user to more frequently launch the application or to have the application visible via a content device for a longer period of time. Many models maintained by the online system are unable to leverage information associated with the user by the online system to determine a likelihood of the user's long-term interaction or engagement with the application.

To determine likelihoods of the user performing different interactions with the application after the threshold amount of time after presentation of a content item associated with the application, the online system receives information describing interactions by the user with the application executing on a client device associated with the user. In some embodiments, the application executing on the client device communicates information describing interactions by the user with the application from the client device to the online system. Alternatively, the application executing on the client device communicates information describing interactions by the user with the application to a third party system, which communicates the information to the online system. The information received by the online system includes information identifying the user to the online system, information identifying the application to the online system, and descriptions of one or more interactions by the user with the application or other interactions with the application that area associated with the user. The received information also includes a timestamp associated with each interaction by the user with the application specifying a date and a time when each interaction occurred.

Various interactions with the application may be described by the received information. For example, the received information describes an amount of time the user has spent using the application. In some embodiments, the amount of time the user has spent using the application is a length of time the user has used the application since launching the application on the client device. Alternatively, the amount of time the user has spent using the application is a length of time the user has used the application during a particular time interval (e.g., from a time period between a time when the application sent earlier information describing interactions by the user with the application and a time when the application sent the information describing interactions by the user with the application). Similarly, the received information may specify a frequency with which the user accesses the application (e.g., a number of times the user launches the application per day or per other time interval, the number of times the user interacts with the application for at least a threshold amount of time per specific time interval, etc.). Additionally or alternatively, the received information specifies a number of times the user accesses or launches the application via the client device within a specific time interval. Further, the received information may specify an amount of time the user has had the application visible via the client device.

Alternatively or additionally, the information received by the online system specifies a number of one or more particular actions the user performed via the application. In various embodiments, the application identifies a set of actions the user performed via the application and provides information identifying actions in the set, or a number of each action in the set, performed by the user via the application. Different applications may provide the online system with information identifying different actions performed via an application by the user. In some embodiments, the online system receives information identifying the user, different actions performed by the user via the application, and timestamps indicating when the user performed each action; the online system combines the numbers of different actions received from the application to determine a number of times the user performed each action. Alternatively, the online system receives a number of times the user performed different actions via the application during a time interval.

In some embodiments, the received information specifies an amount of compensation received by the application from the user during a time interval. For example, the received information combines amounts of compensation received by the application from the user during a time interval and provides the combined amount of compensation received by the application to the online system. Alternatively, the application provides the online system with amounts of compensation received from the user as the application receives the amounts of compensation, and the online system aggregates amounts of compensation received by the application during one or more time intervals. Additionally or alternatively, the received information identifies one or more actions performed by the user after being presented by certain content in the application. For example, the received information identifies one or more specific actions performed by the user within a threshold amount of time after being presented with a particular content item via the application. The received information includes timestamps associated with each of the identified specific actions performed by the user within the threshold amount of time after being presented with the particular content item via the application, and the online system aggregates different specific actions performed by the user within the threshold amount of time after being presented with the particular content item via the application to determine a number of occurrences of different specific actions by the user within the threshold amount of time after being presented with the particular content item. Alternatively, the application aggregates occurrences of different specific actions performed by the user after being presented with certain content by the application over a duration and provides the number of occurrences of different actions by the user after being presented with certain content via the application within the duration to the online system. Additionally, the received information may identify a number of connections between the user and other users via the application, interactions by other users of the application with content provided to the application by the user, interactions by the user with other content provided to the application by other users, or any other suitable information describing interaction between the user and other users via the application. In various embodiments, the online system receives information describing any number or any combination of the previously identified information describing interactions by the user with the application.

As the information describing interactions by the online system user with the application includes information identifying the user to the online system, the online system maintains the information describing the interactions by the user with the application in association with the application and with the user. For example, the online system maintains an identifier of the application and an identifier of the user in association with each described interaction by the user with the application, along with a timestamp associated with each described interaction. In some embodiments, the online system maintains the received information from the application in a user profile maintained for the user by the online system.

As the online system selects content for presentation to the user based on the user's likelihood of interacting with the content or performing actions after being presented with the content, accounting for the user's interaction with the application over time is relevant to content selection for the user by the online system. the online system generates one or more models determining one or more metrics describing engagement with the application by the user at times subsequent to presentation of content items associated with the application based on the received information describing interactions by the user with the application. The generated one or more models allow the online system to account for interactions by the user with the application over a longer time interval (e.g., greater than a threshold amount of time To generate the one or more models determining the one or more metrics describing engagement with the application at subsequent times, the online system obtains a future time for which one or more metrics describing engagement with the application is to be determined. In some embodiments, a publishing user associated with the application provides the online system with a future time by specifying a length of time from presentation of a content item associated with the application to engagement by the user with the application. Alternatively, the online system determines a length of time after presentation of a content item associated with the application to the user for the future time based on characteristics of other content items presented to the user (or to additional users) and interactions by the user (or by the additional users) after presentation of the other content items. In other embodiments, the online system may obtain a specific future date from a publishing user associated with the application or from a third party system associated with the application.

Based on the obtained future time, the online system retrieves maintained interactions by the user with the application that occurred greater than a threshold amount of time prior to the future time. Hence, the online system retrieves interactions by the user with the application associated with timestamps greater than the threshold amount of time prior to the future time. In some embodiments, the online system retrieves maintained interactions by the user with the application that occurred between the threshold amount of time prior to the future time and before an additional threshold time that is farther before the future time than the threshold amount of time.

From the retrieved interactions and characteristics of the user, the online system generates one or more models that describe engagement by the user with the application at the future time. In some embodiments, each model determines one or more of the metrics describing engagement by the user with the application at the future time. For example, the online system generates a model that determines a particular interaction by the user with the application at the future time. In various embodiments, the online system generates a model describing a type of engagement by the user with the application at the future time by applying one or more supervised learning methods to the retrieved interaction that generates a model determining the type of engagement at the future time based on interactions by the user with the application occurring at least the threshold amount of time prior to the future time. Any suitable supervised learning method or methods may be used by the online system in various embodiments to generate the one or more models.

Various metrics describing engagement by the user with the application at the future time may be determined by the one or more models. For example, a metric determines an amount of time the user will spend using the application at the future time, such as an amount of time the application is visible via the client device at and after the future time or an amount of time the application receives input from the user at the future time. As another example, a metric identifies a number of a particular action the user will perform via the application at and after the future time (e.g., a number of a particular action with the application, a number of a particular action performed after the application presents certain content to the user). In another example, a metric determines an amount of compensation the application will receive from the user during an interval starting at the future time. Other metrics that may be generated by the one or more models identify a number of connections the user will establish with other users via the application during an interval starting at the future time, an amount of interaction by other users with content provided to the application by the user during the interval starting at the future time, a number of times the user will launch the application via the client device during the interval starting at the future time, or any other suitable measure of one or more interactions by the user with the application during the interval starting at the future time.

The online system stores the generated one or more models in association with the user and with the application. For example, the online system stores a generated model in association with information identifying the user and information identifying the application, allowing subsequent retrieval of the model for determining engagement by the user with the application. In some embodiments, the online system stores the generated one or more models in association with information identifying the application in a user profile maintained for the user by the online system. After storing the generated one or more models in association with the user and the application, the online system subsequently uses the one or more models when selecting content for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
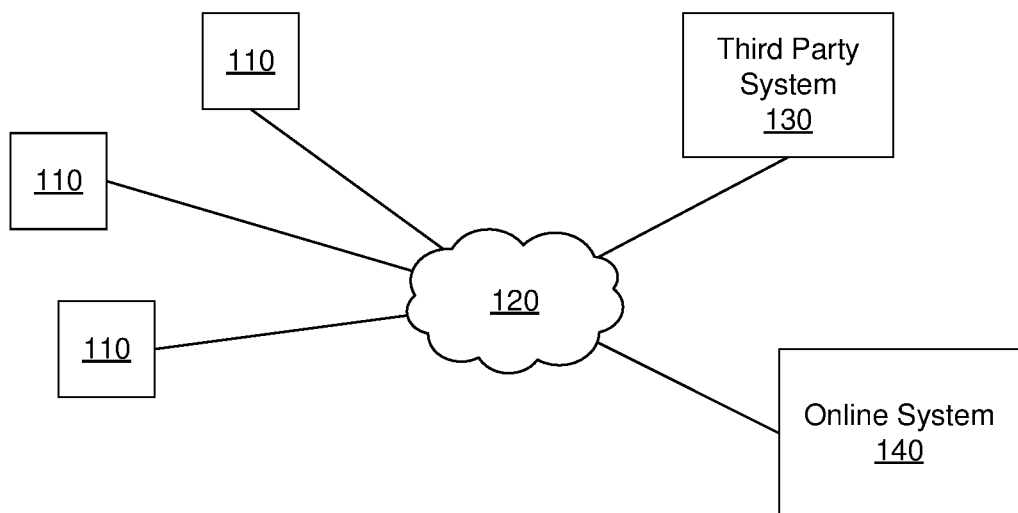
FIG. 1 is a block diagram of a system environment in which a social networking system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
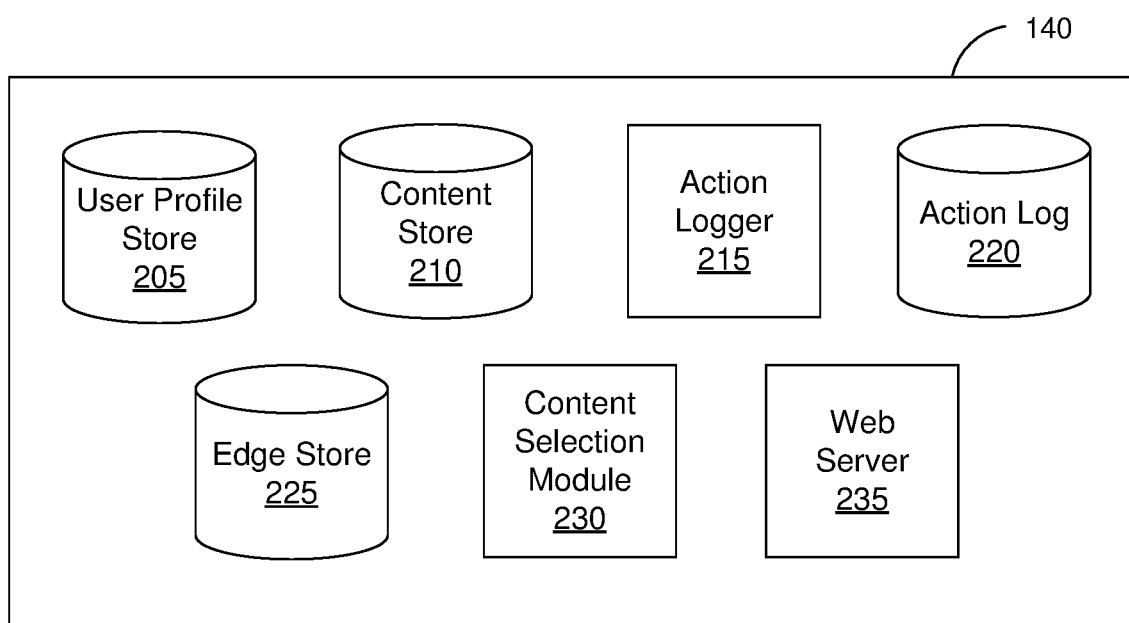
FIG. 2 is a block diagram of a social networking system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. The connections between users and other objects, or edges, can be uni-directional (e.g., a user following another user) or bi-directional (e.g., a user is a friend with another user).

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on attributes associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

In various embodiments, the content selection module 230 maintains various models that determine likelihoods of users performing various actions when presented with a content item or after being presented with a content item. As certain content items may be associated with applications, the content selection module 230 generates one or more models determining metrics describing engagement by users with the application at a future time after presentation of one or more content items associated with the application. The future time is greater than a threshold amount of time after presentation of a content item associated with the application in various embodiments. As further described below in conjunction with FIGS. 3 and 4, the content selection module 230 retrieves prior actions by a user with the application from the action log 220 and generates the one or more models for the user from the retrieved actions. The content selection module 230 stores the one or more models in association with the user and in association with the application, allowing the content selection module to account for engagement by the user with the application at, or after, the future time when selecting content for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed includes content items such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
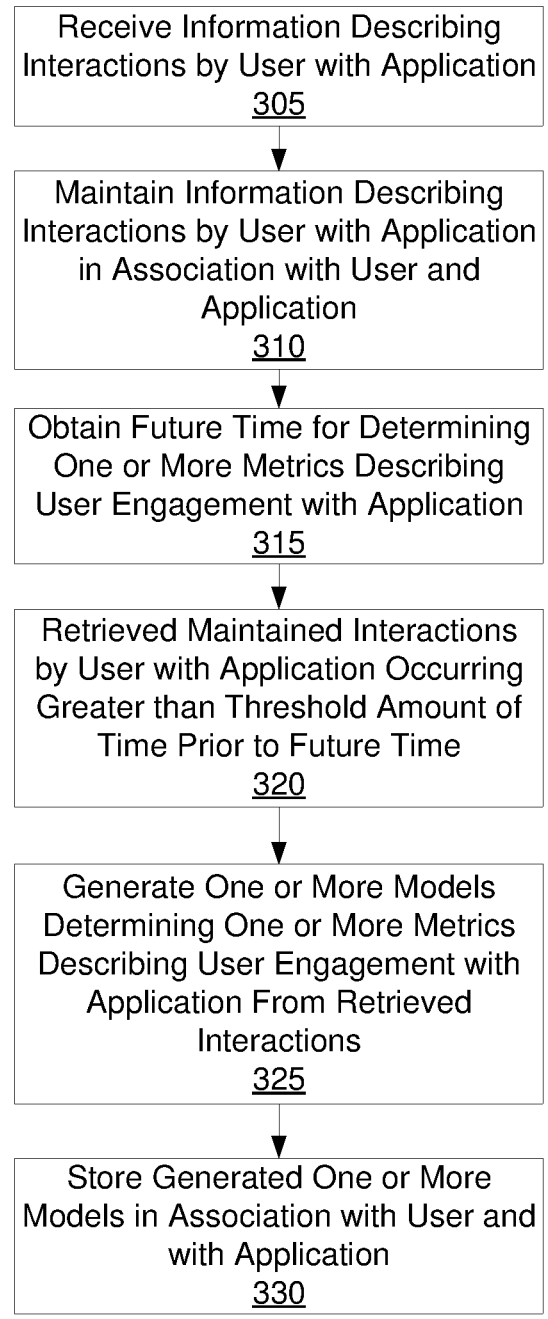
FIG. 3 is a flowchart of a method for an online system determining engagement with an application by an online system user at a future time, in accordance with an embodiment.

Determining Engagement by an Online System User with an Application at a Future Time FIG. 3 is a flowchart of one embodiment of a method for an online system 140 to determine engagement with an application by an online system user at a future time. In various embodiments, the steps described in conjunction with FIG. 3 may be performed in different orders. Additionally, in some embodiments, the method may include different and/or additional steps than those shown in FIG. 3.

The online system 140 receives 305 information describing interactions by a user of the online system 140 with an application executing on a client device 110 associated with the user. In some embodiments, the application executing on the client device 110 communicates information describing interactions by the user with the application from the client device 110 to the online system 140. Alternatively, the application executing on the client device 110 communicates information describing interactions by the user with the application to a third party system 130, which communicates the information to the online system 140. Information received 305 by the online system 140 includes information identifying the user to the online system 140, information identifying the application to the online system 140, and descriptions of one or more interactions by the user with the application or other interactions with the application that area associated with the user. The received information also includes a timestamp associated with each interaction by the user with the application specifying a date and a time when each interaction occurred. In some embodiments, the online system 140 receives 305 information describing interactions by the user with the application as the application identifies interactions by the user. Alternatively, the online system 140 receives 305 information from the application at periodic intervals describing interactions with the application occurring within an interval.

Various interactions with the application may be described by the received information. For example, the received information describes an amount of time the user has spent using the application. In some embodiments, the amount of time the user has spent using the application is a length of time the user has used the application since launching the application on the client device 110. Alternatively, the amount of time the user has spent using the application is a length of time the user has used the application during a particular time interval (e.g., from a time period between a time when the application sent earlier information describing interactions by the user with the application and a time when the application sent the information describing interactions by the user with the application). Similarly, the received information may specify a frequency with which the user accesses the application (e.g., a number of times the user launches the application per day or per other time interval, the number of times the user interacts with the application for at least a threshold amount of time per specific time interval, etc.). Additionally or alternatively, the received information specifies a number of times the user accesses or launches the application via the client device 110 within a specific time interval. Further, the received information may specify an amount of time the user has had the application visible via the client device 110.

Alternatively or additionally, the information received 305 by the online system 140 specifies a number of one or more particular actions the user performed via the application. In various embodiments, the application identifies a set of actions the user performed via the application and provides information identifying actions in the set, or a number of each action in the set, performed by the user via the application. Different applications may provide the online system 140 with information identifying different actions performed via an application by the user. In some embodiments, the online system 140 receives 305 information identifying the user, different actions performed by the user via the application, and timestamps indicating when the user performed each action; the online system 140 combines the numbers of different actions received 305 from the application to determine a number of times the user performed each action. Alternatively, the online system 140 receives a number of times the user performed different actions via the application during a time interval.

In some embodiments, the received information specifies an amount of compensation received by the application from the user via the application during a time interval. For example, the received information combines amounts of compensation received by the application from the user during a time interval and provides the combined amount of compensation received by the application to the online system 140. Alternatively, the application provides the online system 140 with amounts of compensation received from the user as the application receives the amounts of compensation, and the online system 140 aggregates amounts of compensation received by the application during one or more time intervals. Additionally or alternatively, the received information identifies one or more actions performed by the user after being presented by certain content in the application. For example, the received information identifies one or more specific actions performed by the user within a threshold amount of time after being presented with a particular content item via the application. The received information includes timestamps associated with each of the identified specific actions performed by the user within the threshold amount of time after being presented with the particular content item via the application, and the online system 140 aggregates different specific actions performed by the user within the threshold amount of time after being presented with the particular content item via the application to determine a number of occurrences of different specific actions by the user within the threshold amount of time after being presented with the particular content item. Alternatively, the application aggregates occurrences of different specific actions performed by the user after being presented with certain content by the application over a duration and provides the number of occurrences of different actions by the user after being presented with certain content via the application within the duration to the online system 140. Additionally, the received information may identify a number of connections between the user and other users via the application, interactions by other users of the application with content provided to the application by the user, interactions by the user with other content provided to the application by other users, or any other suitable information describing interaction between the user and other users via the application. In various embodiments, the online system 140 receives 305 information describing any number or any combination of the previously identified information describing interactions by the user with the application.

As the information describing interactions by the online system user with the application includes information identifying the user to the online system 140, the online system 140 maintains 310 the information describing the interactions by the user with the application in association with the application and with the user. For example, the online system 140 maintains 310 an identifier of the application and an identifier of the user in association with each described interaction by the user with the application, along with a timestamp associated with each described interaction. This allows the online system 140 to maintain 310 a log of interactions with the application by the user along with dates and times when the application identified each of the interactions performed by the user.

As the online system 140 selects content for presentation to the user based on the user's likelihood of interacting with the content or performing actions after being presented with the content, accounting for the user's interaction with the application over time is relevant to content selection for the user by the online system 140. However, many models used by the online system 140 determine likelihoods of the user performing actions within a threshold amount of time after being presented with content associated with the application. For example, models used by the online system 140 determine a likelihood of the user installing the application after being presented with a content item associated with the application. However, the user's engagement with the application after the threshold amount of time may affect an amount of compensation a publishing user associated with the application provides the online system 140 in exchange for presenting certain content items associated with the application, which affects a likelihood of the online system 140 presenting the certain content items to the user if the online system 140 receives compensation from the publishing user in exchange for presenting the certain content items. Additionally, the publishing user may associate objectives with one or more content items specifying interactions by the user with the application occurring longer times after presentation of the content items, so determining likelihoods or estimates of the user performing one or more interactions with the application greater than a threshold amount of time after presentation of the one or more content items affects determination of whether to present the one or more content items to the user. Accordingly, based on the received information describing interactions by the user with the application, the online system 140 generates one or more models that determine one or more metrics describing engagement with the application by the user at times subsequent to presentation of content items associated with the application.

To generate the one or more models determining the one or more metrics describing engagement with the application at subsequent times, the online system 140 obtains 315 a future time for which one or more metrics describing engagement with the application is to be determined. In some embodiments, a publishing user associated with the application provides the online system 140 with a future time by specifying a length of time from presentation of a content item associated with the application to engagement by the user with the application. Alternatively, the online system 140 determines a length of time after presentation of a content item associated with the application to the user for the future time based on characteristics of other content items presented to the user (or to additional users) and interactions by the user (or by the additional users) after presentation of the other content items. In other embodiments, the online system 140 may obtain 315 a specific future date from the publishing user associated with the application or from a third party system 130 associated with the application.

Figure 4:
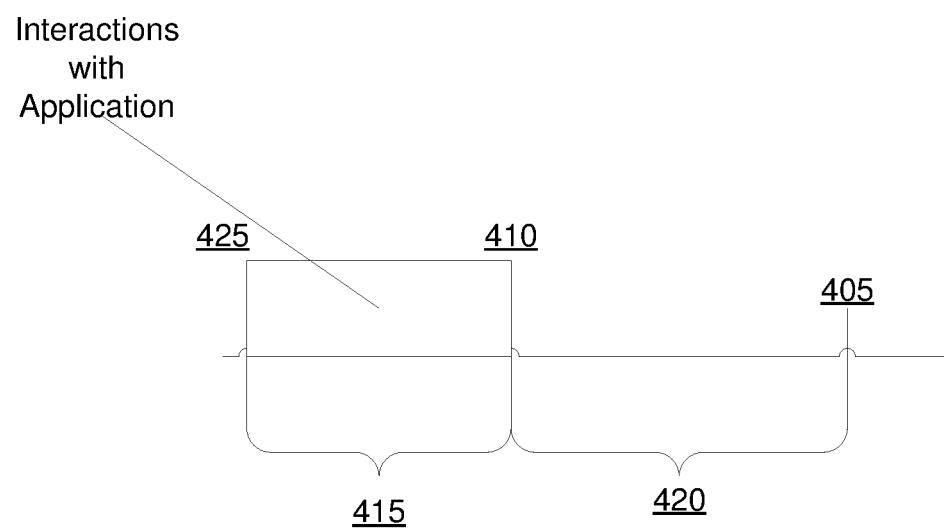
FIG. 4 is an example of a time interval from which interactions by the user with an application are retrieved by an online system to determine a model that determines engagement by the user with the application at a future time, in accordance with an embodiment.

Based on the obtained future time, the online system 140 retrieves 320 maintained interactions by the user with the application that occurred greater than a threshold amount of time prior to the future time. Hence, the online system 140 retrieves 320 interactions by the user with the application associated with timestamps greater than the threshold amount of time prior to the future time. In some embodiments, the online system 140 retrieves 320 maintained interactions by the user with the application that occurred between the threshold amount of time prior to the future time and before an additional threshold time that is farther before the future time than the threshold amount of time. FIG. 4 shows an example of a time interval from which interactions by the user with the application are retrieved 320. In the example of FIG. 4, the online system 140 has obtained 315 the future time 405 for which the one or more metrics describing user engagement with the application are to be determined. For example, the future time 405 is a specified duration after a content item associated with the application is presented to the user. The online system 140 retrieves 320 interactions by the user with the application occurring at least a threshold amount of time 420 prior to the future time. Hence, in the example of FIG. 4, the online system 140 retrieves interactions by the user with the application that occurred at or before time 410. However, interactions by the user with the application occurring between time 410 and the future time 405 are not retrieved. In some embodiments, the online system 140 retrieves interactions by the user with the application that occurred between time 410 and a cutoff time 425 that is earlier than time 410. Hence, the online system 140 retrieves interactions by the user with the application during an interval 415 between the cutoff time 425 and time 410, but does not retrieve interactions by the user with the application occurring between time 410 and the future time 405. In various embodiments, the threshold amount of time 420 may be specified by a user or a third party system 130 associated with the application or may be determined by the online system 140 based on any suitable criteria.

From the retrieved interactions and characteristics of the user, the online system 140 generates 325 one or more models that describe engagement by the user with the application at the future time. In some embodiments, each model determines one or more of the metrics describing engagement by the user with the application at the future time. For example, the online system 140 generates 325 a model that determines a particular interaction by the user with the application at the future time. In various embodiments, the online system 140 generates 325 a model describing a type of engagement by the user with the application at the future time by applying one or more supervised learning methods to the retrieved interaction that generates a model determining the type of engagement at the future time based on interactions by the user with the application occurring at least the threshold amount of time prior to the future time.

Any suitable supervised learning method or methods may be used by the online system 140 in various embodiments to generate 325 the one or more models.

Various metrics describing engagement by the user with the application at the future time may be determined by the one or more models. For example, a metric determines an amount of time the user will spend using the application at the future time, such as an amount of time the application is visible via the client device 110 at and after the future time or an amount of time the application receives input from the user at the future time. As another example, a metric identifies a number of a particular action the user will perform via the application at and after the future time (e.g., a number of a particular action with the application, a number of a particular action performed after the application presents certain content to the user). In another example, a metric determines an amount of compensation the application will receive from the user during an interval starting at the future time. Other metrics that may be generated by the one or more models identify a number of connections the user will establish with other users via the application during an interval starting at the future time, an amount of interaction by other users with content provided to the application by the user during the interval starting at the future time, a number of times the user will launch the application via the client device 110 during the interval starting at the future time, or any other suitable measure of one or more interactions by the user with the application during the interval starting at the future time.

The online system 140 stores 330 the generated one or more models in association with the user and with the application. For example, the online system 140 stores 330 a generated model in association with information identifying the user and information identifying the application, allowing subsequent retrieval of the model for determining engagement by the user with the application. In some embodiments, the online system 140 stores 330 the generated one or more models in association with information identifying the application in a user profile maintained for the user by the online system 140.

After storing 330 the generated one or more models in association with the user and the application, the online system 140 subsequently uses the one or more models when selecting content for presentation to the user. For example, the online system 140 receives a content item associated with the application, uses the one or more models to determine the one or more metrics describing engagement by the user with the application at a time subsequent to presentation of the content item associated with the application, and includes the one or more metrics in one or more selection processes selecting content for presentation to the user. The one or more metrics describing engagement by the user with the application at the time subsequent to presentation of the content item may affect a likelihood of the user interacting with the content item associated with the application, which accordingly influences whether the online system 140 selects the content item associated with the application for presentation to the user.

Similarly, the online system 140 may present content associated with the application, such as one or more content items associated with the application, and apply the one or more models to interactions with the application by the user after presentation of the content associated with the application. Based on the one or more metrics describing engagement with the application subsequently selects additional content associated with the application for presentation to the user. As described above, the one or more metrics describing engagement with the application by the user may affect likelihoods of the user performing interactions specified by one or more content items associated with the application, which affect whether one or more selection processes select the one or more content items associated with the application for presentation to the user.

In various embodiments, the online system 140 may apply the one or more models associated with the user and with the application to characteristics of the user or interactions by the user with the application to determine the one or more metrics describing engagement by the user with the application at later times and select certain types of content for presentation to the user based on the determined one or more metrics. For example, the online system 140 determines a metric describing engagement by the user with the application at a later time, and determines whether to send a notification identifying the application to the user. Hence, the online system 140 may use one or more metrics describing engagement by the user with the application at future times when selecting any suitable type of content (e.g., notifications, suggestions for the user to perform one or more actions, search results, etc.) to the user for presentation.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information at an online system describing interactions by a user of the online system with an application executing on a client device;
maintaining the information describing interactions by the user of the online system with the application at the online system;
obtaining a future time from presentation of a content item associated with the application for which one or more metrics describing engagement with the application by the user is to be determined, the future time comprising a length of time from presentation of the content item associated with the application to engagement by the user with the application;
retrieving interactions by the user of the online system with the application occurring within a time period that is greater than a threshold amount of time prior to the future time;
generating one or more models based on the retrieved interactions, each model determining one or more metrics describing engagement with the application at the future time;
storing the generated one or more models in association with the user and with the application;
presenting content associated with the application to the user via the online system for a duration;
applying the one or more models to interactions with the application occurring during different intervals of the duration to determine the one or more metrics describing engagement with the application for the different intervals of the duration; and
selecting additional content associated with the application based on the one or more metrics describing engagement with the application for the different intervals of the duration.

2. The method of claim 1, wherein a metric describing engagement with the application at the future time comprises an amount of time the user will spend using the application at and after the future time.

3. The method of claim 1, wherein a metric describing engagement with the application at the future time comprises a number of one or more particular actions that the user will perform via the application at and after the future time.

4. The method of claim 1, wherein a metric describing engagement with the application at the future time comprises an amount of compensation the application will receive from the user during an interval starting at the future time.

5. The method of claim 1, wherein the received information describing interactions by the user of the online system with the application executing on the client device is selected from a group consisting of: an amount of time spent by the user using the application, a frequency with which the user accesses the application, a number of times the user accesses the application, and any combination thereof.

6. The method of claim 1, wherein the received information describing interactions by the user of the online system with the application executing on the client device comprises a number of one or more particular actions performed via the application by the user.

7. The method of claim 1, wherein the received information describing interactions by the user of the online system with the application executing on the client device comprises an amount of compensation received by the application from the user.

8. The method of claim 1, wherein the received information describing interactions by the user of the online system with the application executing on the client device comprises a number of one or more actions performed by the user after being presented with certain content via the application.

9. The method of claim 1, wherein the received information describing interactions by the user of the online system with the application executing on the client device comprises a number of connections between the user and other users of the application via the application.

10. The method of claim 1, wherein the received information describing interactions by the user of the online system with the application executing on the client device comprises an amount of interactions by other users with content provided to the application by the user.

11. A method comprising:
receiving information at an online system describing interactions by a user of the online system with an application executing on a client device;
maintaining the information describing interactions by the user of the online system with the application at the online system;
obtaining a future time from presentation of a content item associated with the application for which one or more metrics describing engagement with the application by the user is to be determined, the future time comprising a length of time from presentation of the content item associated with the application to engagement by the user with the application;
retrieving interactions by the user of the online system with the application occurring within a time period that is greater than a threshold amount of time prior to the future time;
generating one or more models based on the retrieved interactions, each model determining one or more metrics describing engagement with the application at the future time; and
storing the generated one or more models in association with the user and with the application.

12. The method of claim 11, wherein a metric describing engagement with the application at the future time is selected from a group consisting of: an amount of time the user will spend using the application at and after the future time, a number of one or more particular actions that the user will perform via the application at and after the future time, an amount of compensation the application will receive from the user during an interval starting at the future time and any combination thereof.

13. The method of claim 11, wherein the received information describing interactions by the user of the online system with the application executing on the client device is selected from a group consisting of: an amount of time spent by the user using the application, a frequency with which the user accesses the application, a number of times the user accesses the application, and any combination thereof.

14. The method of claim 11, wherein the received information describing interactions by the user of the online system with the application executing on the client device comprises a number of one or more particular actions performed via the application by the user.

15. The method of claim 11, wherein the received information describing interactions by the user of the online system with the application executing on the client device comprises an amount of compensation received by the application from the user.

16. The method of claim 11, wherein the received information describing interactions by the user of the online system with the application executing on the client device comprises a number of one or more actions performed by the user after being presented with certain content via the application.

17. The method of claim 11, wherein the received information describing interactions by the user of the online system with the application executing on the client device is selected from a group consisting of: a number of connections between the user and other users of the application via the application, an amount of interactions by other users with content provided to the application by the user, and any combination thereof.

18. A computer program product comprising a non-transitory computer readable medium having instructions encoded thereon that, when executed by a processor, cause the processor to:
receive information at an online system describing interactions by a user of the online system with an application executing on a client device;
maintain the information describing interactions by the user of the online system with the application at the online system;
obtain a future time from presentation of a content item associated with the application for which one or more metrics describing engagement with the application by the user is to be determined, the future time comprising a length of time from presentation of the content item associated with the application to engagement by the user with the application;
retrieve interactions by the user of the online system with the application occurring within a time period that is greater than a threshold amount of time prior to the future time;
generate one or more models based on the retrieved interactions, each model determining one or more metrics describing engagement with the application at the future time; and
store the generated one or more models in association with the user and with the application.

19. The computer program product of claim 18, wherein a metric describing engagement with the application at the future time is selected from a group consisting of: an amount of time the user will spend using the application at and after the future time, a number of one or more particular actions that the user will perform via the application at and after the future time, an amount of compensation the application will receive from the user during an interval starting at the future time and any combination thereof.

20. The computer program product of claim 18, wherein the non-transitory computer readable storage medium further has instructions encoded thereon that, when executed by the processor, cause the processor to:
generate the one or more metrics describing engagement with the application at the future time by applying the generated one or more models to information associated with the user by the online system; and
select content associated with the application for presentation to the user based on the generated one or more metrics describing engagement with the application at the future time.

* * * * *